United States Patent [19]

Fujishige et al.

[11] 3,975,328
[45] Aug. 17, 1976

[54] METHOD FOR MANUFACTURE OF POLYMER HAVING DIFFERENT STEREOSPECIFIC STRUCTURES AT DESIRED RATIO FROM VINYL MONOMERS

[75] Inventors: Shoei Fujishige, Yokohama; Mitsuo Suzuki, Tokyo, both of Japan

[73] Assignee: Agency of Industrial Science & Technology, Tokyo, Japan

[22] Filed: Oct. 29, 1974

[21] Appl. No.: 518,785

[30] Foreign Application Priority Data

Nov. 8, 1973  Japan............................ 48-125603

[52] U.S. Cl............................ 260/63 R; 260/63 K;
260/63 UY; 526/72; 526/211; 526/204;
526/222; 526/328; 526/217; 526/193
[51] Int. Cl.²................... C08F 4/56; C08F 16/36;
C08F 20/18; C08F 20/44
[58] Field of Search ............... 260/88.7 E, 89.5 R,
260/89.5 A, 85.5 L, 63 R, 63 K, 63 UY

[56] References Cited
UNITED STATES PATENTS

| 3,006,894 | 10/1961 | Evans et al. | 260/63 |
| 3,103,503 | 9/1963 | Fox et al. | 260/89.5 |
| 3,285,894 | 3/1975 | Lim et al. | 260/88.7 |
| 3,330,785 | 7/1967 | Boyd | 260/2.5 |
| 3,761,529 | 9/1973 | Drahoslav et al. | 260/643 A |

*Primary Examiner*—John Kight, III
*Attorney, Agent, or Firm*—Oblon, Fisher, Spivak, McClelland & Maier

[57] ABSTRACT

Disclosed is a method whereby a vinyl compound such as an $\alpha,\beta$-carbonyl compound, acrylonitrile or methacrylonitrile is polymerized in a non-protonic organic medium in the presence of an alkali metal alcoholate as the polymerization catalyst. High polymers having different stereospecific structures contained at a desired ratio as well as low polymers having regulated stereochemical structures are manufactured from vinyl compounds such as above mentioned by selecting reaction conditions such as the kind of organic medium to be used and the amount of the catalyst in use based on that of the charged vinyl compound.

6 Claims, 2 Drawing Figures

The probabilities of isotactic heterotactic and syndiotactic triads as a function of $P_m$

METHOD FOR MANUFACTURE OF POLYMER HAVING DIFFERENT STEREOSPECIFIC STRUCTURES AT DESIRED RATIO FROM VINYL MONOMERS

BACKGROUND OF THE INVENTION

This invention relates to a method for the polymerization of vinyl monomers and more specifically to a method for the manufacture of polymers having different stereospecific structures at desired ratios with ease by regulating reaction conditions.

Heretofore it has been resignedly held that vinyl monomers such as $\alpha$, $\beta$-unsaturated carbonyl compounds, acrylonitrile and methacrylonitrile are not polymerizable with alcoholates in ordinary organic solvents. If they are somehow polymerized at all, the yields of reaction products obtained are usually found to be extremely low. It has been known to synthesize such low polymers as dimers and trimers from said vinyl monomers through the Michael reaction. It has never been known to the art, however, that the contents of different isomers of varying stereochemical structures in the produced low polymers can artificially be controlled by suitably selecting the conditions of the reaction involved.

An object of this invention is to provide a method for the manufacture of a polymer having different stereospecific structures contained at a desired ratio from a vinyl monomer selected from among $\alpha$, $\beta$-unsaturated carbonyl compounds, acrylonitrile, methacrylonitrile, etc.

Another object of this invention is to provide a method for the manufacture of a low polymer mixture possessed of a regulated steroisomer content as desired and capable of being fractionally distilled into different stereoisomers, from a vinyl monomer selected from among $\alpha$, $\beta$-unsaturated carbonyl compounds, acrylonitrile, methacrylonitrile, etc.

SUMMARY OF THE INVENTION

To attain these objects of the present invention, there is provided a method for polymerizing a vinyl monomer selected from among acrylic esters, methacrylic esters, vinyl ketones, $\alpha$-methylvinyl ketones, $\beta$-methylcrotonic esters, acrylonitrile and methacrylonitrile by the anionic polymerization mechanism in an non-protonic organic medium having an alcoholate dissolved therein. The stereospecific structure of the polymer thus formed depends greatly on the properties of the particular nonprotonic organic solvent to be used in the reaction and slightly on the temperature of reaction.

Further in the present invention, a solution prepared by mixing a non-protonic organic solvent in the alcohol solution of an alcoholate is employed as the reaction system, in which the aforementioned vinyl monomer is subjected to the mechanism of Michael reaction to produce a low polymer. The low polymer thus produced is a mixture of stereoisomers. The ratio at which the component stereoisomers are mixed therein depends to a great extent on the properties of the nonprotonic organic solvent used in the reaction medium and slightly on the temperature of reaction. By suitably selecting an organic solvent for the reaction, a polymer of which stereochemical regularity of structures is desirably regulated can be obtained from the vinyl monomer as the starting material.

Other characteristic features and other advantages of this invention will become apparent from the further description to be given herein below with reference to the accompanying drawings.

DETAILED DESCRIPTION OF THE INVENTION

Figure 1:
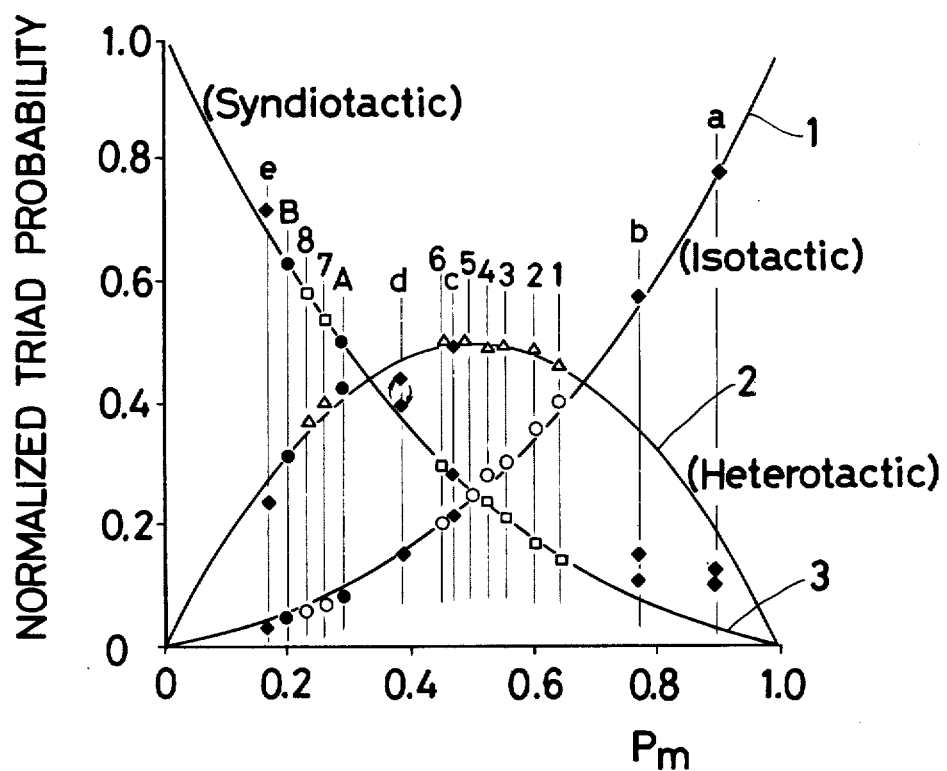
FIG. 1 is a Bernoullian plot showing stereospecific structures of polymethyl methacrylates.

To clarify the characteristics of the present invention as particularly concerns high polymers, a description will first be given of the Bernoullian plot of FIG. 1 which is well known as means for characterizing the stereospecific structures of polymethyl methacrylate or the polymer of methyl methacrylate taken as a representative vinyl monomer. The graph shows probabilities of isotactic, heterotactic and syndiotactic triads as a function of $P_m$, with the abscissa representing the magnitude of $P_m$ and the ordinate the normalized triad probability. The lines 1, 2 and 3 are theoretical curves indicative of the compositions of isotactic component, heterotactic component and syndiotactic component as a function of $P_m$. The plots falling in the vertical lines 1 through 8 are those of polymethyl methacrylate products obtained by the method of this invention to be described in detail afterward. The aforementioned components of polymers are indicated in this graph by the marks o, $\Delta$ and $\square$ respectively. The plots of the components indicated by the marks ◆ and ● and falling in the vertical lines $a$, $b$, $c$, $d$, $e$, A and B are those of polymers produced by the known methods. The polymers indicated by the mark ◆ are the products obtained in accordance with the method published by R. C. Ferguson in Macromolecules, 2, 237 (1969) and the polymers indicated by the mark ● are the products manufactured in accordance with the method published by H. L. Frisch, C. L. Mallows, F. Heatley and F. A. Bovey in Macromolecules, 1, 533 (1968). The polymers whose plots fall in the vertical lines A, B and e are obtained by the radical polymerization mechanism. From this, it may be inferred that the stereospecific structure of any polymethyl methacrylate product obtainable by the radical polymerization mechanism can be regulated within the range of from 0.17 to 0.3 of the parameter $P_m$. The plots falling in the vertical lines $a$, $b$ and $d$ are those of the polymethyl methacrylate products synthesized by using the Grignard's catalyst. As is evident from the graph, the fact that the plots deviate from the theoretical curves characterizes the polymerization reaction involving the use of the Grignard's catalyst system. The plots falling in the vertical line $c$ are those of the polymethyl methacrylate product obtained by the method resorting to use of $NaBH_4$ catalyst as disclosed in DuPont's Defensive Publication 875,006 (W. S. Zimmt). In the case of the polymethyl methacrylate products obtainable by the present invention, regulation of the stereospecific structures thereof can be attained in the range of from 0.22 to 0.70 of the parameter $P_m$. The plots representing the products according to this invention are invariably found to be satisfactorily in agreement with the theoretical curves which are expected to contain the values characteristic of the stereospecific structures. In other words, the polymer growth in the polymerization reaction of the present invention is satisfactorily in agreement with Bernoullian statistics.

The present invention will be described in further detail herein below.

This invention relates to a method for the anionic polymerization of vinyl monomers such as, for example, $\alpha, \beta$-unsaturated carbonyl compounds, acrylonitrile and methacrylonitrile. This method is characterized by using an alkali metal alcoholate as the polymerization initiator and a non-protonic organic solvent as the reaction medium. In the production of a high molecular weight polymer, the stereospecific structure of the polymer to be obtained is regulated by the particular kind of an organic solvent selected for use as the reaction medium. In the synthesis of a low molecular weight polymer, the contents of different stereoisomers in the polymer to be obtained is varied by the particular kind of organic solvent selected for use as the reaction medium, making it possible to produce an isomer mixture which can easily be separated into the constituent isomers.

The term "vinyl monomer" as used in the description of this invention refers to $\alpha, \beta$-unsaturated carbonyl compounds such as acrylic esters, methacrylic esters, vinyl ketones, $\alpha$-methylvinyl ketones and $\beta$-methylcrotonic esters and also to acrylonitrile and methacrylonitrile, for example.

The alkali metal alcoholates which are usable as the polymerization initiator in the present invention are aliphatic alkali metal alcoholates: Preferable examples thereof include sodium ethylate, sodium methylate, sodium-t-butylate, potassium ethylate, potassium methylate and potassium-t-butylate.

For use in the present invention, the organic solvents are limited to polar organic solvents of the type which have no dissociable hydrogen atoms in the molecular units and possess a specific function to anionically polymerize the vinyl monomer on dissolution of the polymerization initiator. Examples of the polar organic solvent satisfying such requirement are dioxane, diethyl ether, tetrahydrofuran, tetrahydrofuran, dimethyl formamide, dimethyl acetamide, dimethyl sulfoxide, tetramethyl urea, and tetramethyl phosphoramide. These organic solvents may be used singly or in the form of a combination of two or more members or they may be used in the form diluted with such inert solvents as, for example, n-hexane, cyclohexane, toluene and benzene.

The method by which the polymerization of the present invention is accomplished will be described.

Generally, the alcoholate is available in the form of an alcohol solution as, for example, in the case of sodium methylate which is available in the form of methyl alcohol solution. Where the synthesis of a high molecular weight polymer is aimed at by the present invention, this alcohol must be completely removed by evacuation. The removal of methanol, for example, is quite easy to accomplish. It can easily be distilled out by being heated at about 110°C in the atmosphere of argon gas. Then, the isolated alcoholate is dissolved in the organic solvent selected as the reaction medium. For this invention, selection of the organic solvent is a vitally important factor that has the largest influence upon the regulation (determination) of the stereospecific structure of the polymer to be obtained. Where the polymerization is carried out in an organic solvent of low dielectric constant such as, for example, diethyl ether, dioxane or tetrahydrofuran, there can be obtained reaction conditions under which the parameter $P_m$ ranges from 0.5 to 0.7 in the graph of FIG. 1 of the accompanying drawing, so that the polymer to be obtained will acquire a stereospecific structure abounding in the isotactic component and the heterotactic component. Where the polymerization is performed in an organic solvent of high dielectric constant such as dimethyl formamide or dimethyl sulfoxide, for example, there can be obtained reaction conditions under which the parameter $P_m$ falls in the neighborhood of 0.2 in the graph of FIG. 1, so that the polymer to be obtained will acquire a stereospecific structure abounding in the syndiotactic component and the heterotactic component. After the alcoholate has been dissolved in the organic solvent as described above, the vinyl monomer to be polymerized is added to the resultant solution. At the same time, a small amount of such radical polymerization inhibitor as hydroquinone or 2,4,6-tris(dimethylaminophenol) is added thereto for coexistence. In the present invention, the reaction temperature and the reaction time are not specifically limited because they are variable with the particular polymerization initiator-organic solvent system to be used and the amount of the vinyl monomer to be introduced therein. The reaction system of the present invention is by the anionic polymerization mechanism and the termination of the reaction can be effected by the addition to the reaction system of an excess of the equivalent weight of an alcohol, acetic acid or hydrochloric acid based on the weight of the catalyst in use. The molecular weight of the polymer to be obtained in this polymerization reaction is determined by the molar ratio between the vinyl monomer charged and the alcoholate serving as the polymerization initiator. After the polymerization reaction has been terminated, the coexistent components are suitably removed from the formed polymer. For example, sodium acetate which occurs in consequence of the termination of reaction can be removed by filtration and the solvent component can be removed by fractional distillation or treatment in a precipitant of the type capable of preferentially precipitating the polymer component. Thus is isolated the produced polymer.

Now, the method for the manufacture of low molecular polymers will be described.

The combination of a vinyl monomer as the raw material, an alcoholate catalyst serving as the polymerization initiator and an organic solvent to be involved in the manufacture of a low molecular weight polymer is entirely the same as in the aforementioned production of a high molecular weight polymer, except for the fact that thorough removal of alcohol is an essential requirement for the synthesis of a high molecular weight polymer, whereas no removal of alcohol is required in the manufacture of a low molecular weight polymer. As will be described afterward, the number of mols of the catalyst as used against the number of mols of the vinyl monomer equals the sum of the number of mols of the alcoholate and that of mols of the alcohol coexisting with the alcoholate. In the production of a dimer, for example, it is essential that the sum of the number of mols of the alcoholate and that of mols of the alcohol be 1 where the number of mols of the vinyl monomer charged is 2. In the low molecular weight polymer to be obtained, the ratio at which two stereoisomers, namely the meso isomer and the racemic isomer exist in a dimer or the ratio at which three stereoisomers, namely the isotactic isomer, the heterotactic isomer and the syndiotactic isomer exist in a trimer is governed in the case of this invention by the particular kind of the solvent used as the reaction medium and the reaction temperature. Therefore, the organic solvent and the reaction temperature are required to be selected so as to suit the particular stereochemical structure of the polymer desired to be obtained. Where the polymerization is carried out by using an organic solvent of low dielectric constant such as, for example, dioxane or diethyl ether, the meso isomer will constitute a major component in the case of a dimer and the isotactic isomer and the heterotactic isomer will make up a major percentage composition in the case of a trimer. Where the polymer is obtained by using an organic solvent of high dielectric constant such as, for example, dimethyl formamide or dimethyl sulfoxide, the racemic isomer will predominate in the case of a dimer and the syndiotactic isomer will form a major component in the case of a trimer. Where the polymerization is effected at low reaction temperature, there is observed a trend toward formation of a dimer rich in the meso isomer content and a trimer abounding in the isotactic isomer component. In this case, it is the dielectric constant of the organic solvent selected for use as the reaction medium that has the greatest effect on the stereochemical structure of the compound produced by the reaction. The reaction is terminated by adding to the reaction system a slight excess of the equivalent weight of an alcohol, acetic acid or hydrochloric acid based on the number of mols of the alcoholate in use. From the reaction product containing the formed low molecular weight polymer, a mixture containing different stereoisomers in addition to the low molecular weight polymer can be obtained by suitably removing solids, solvent and other extraneous matter. The separation of the individual isomers which make up the mixture can easily be accomplished by employing the known measures as illustrated in the preferred embodiments which will be cited herein afterward. This invention finds commercial utility in the various applications which are enumerated below.

The high molecular weight polymers to be obtained by the present invention notably differ from the conventional countertypes in terms of stereospecific structures. (High molecular weight polymers other than polymethyl methacrylate do not permit accurate structural analysis. For this reason, they are considered to be analogous to polymethyl methacrylate with respect to the stereospecific structure.)

Since polymethyl methacrylate products of higher molecular weights obtained by the conventional method have melt flow properties unsuitable for molding operations, it has heretofore been customary for the polymers to be prepared with limited molecular weights at the expense of strength and other properties so as to be useful as plastic materials for molding. According to this invention, however, it is now made possible to synthesize high molecular weight polymers having stereospecific structures regulated desirably within a wide range. In terms of the glass transition point as a possible criterion for practical properties, for example, the polymethyl methacrylate according to the present invention can be synthesized with any desired value of glass transition point in the range of from about 105°C to about 55°C, whereas the countertype obtained by the conventional radical polymerization method has a glass transition point of about 105°C. Thus, the present invention is believed to increase greatly the scope of utility of this particular high molecular weight polymer.

The low molecular weight polymers to be produced by the method of this invention can easily be separated into individual isomers. Particularly in the case of dimers and trimers, therefore, the individual isomers obtained by separation thereof are believed, because of the susceptibility to the substitution reaction of their respective side-chain carbonyl groups, to find extensive utility as starting materials for various fine chemicals when they are offered in the form of disubstituents and trisubstituents as well as dicarboxylic acids, diamides, tricarboxylic acids which are invariably possessed of novel stereochemical structures.

The effect of the present invention will be described with reference to preferred embodiments of the invention herein below. It should be understood that the present invention is not limited by these working examples. The working examples are all concerned with the synthesis of polymethyl methacrylate.

Figure 2:
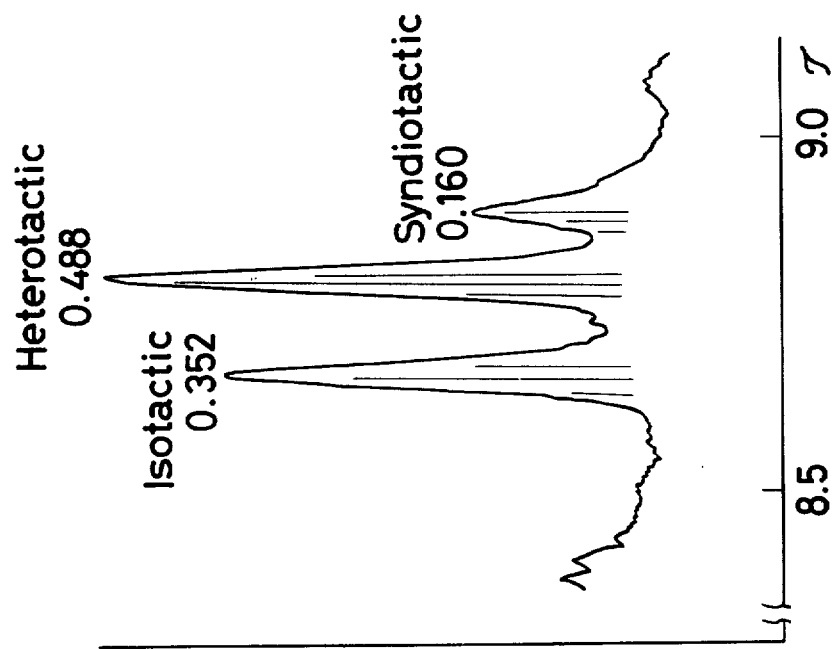
FIG. 2 shows nuclear magnetic resonance (NMR) spectra characterizing the stereospecific structures of the polymers synthesized as described in the preferred embodiments; the spectrum (1) for the polymer of Example 1, (2) for that of Example 3, (3) for that of Example 5 and (4) for that of Example 6 respectively. Numerals at the peaks represent the fraction of each triads, respectively: (left to right) ISOTACTIC, HETEROTACTIC, SYNDIOTACTIC
Figure 2:
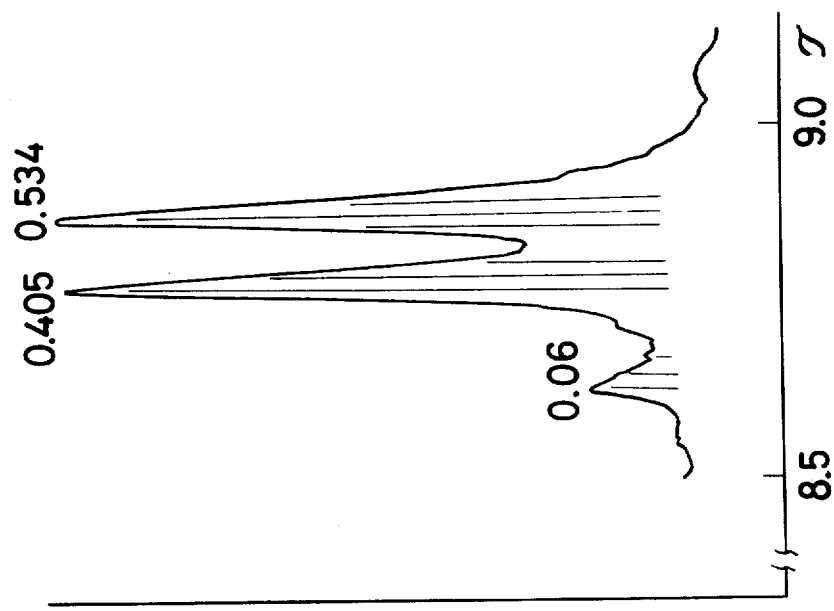
Figure 2:
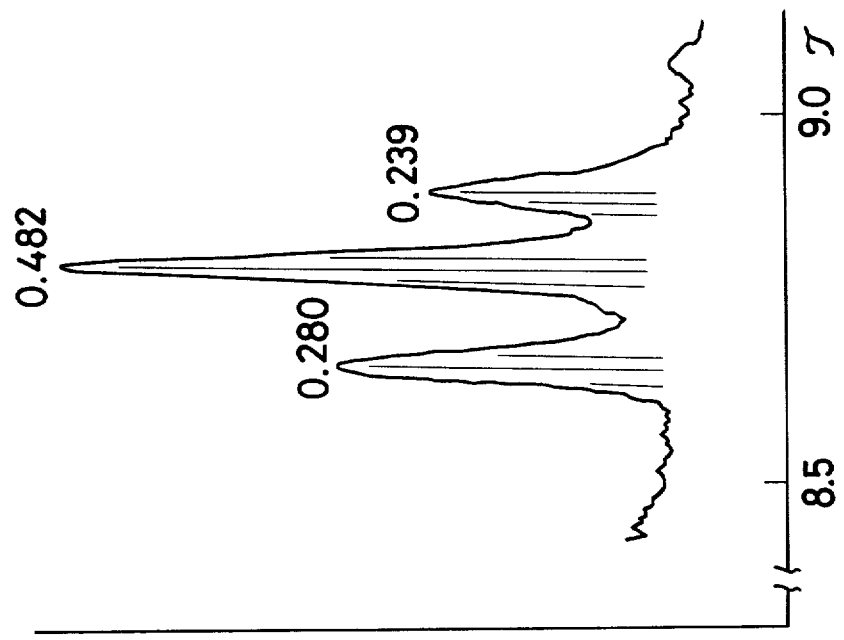
Figure 2:
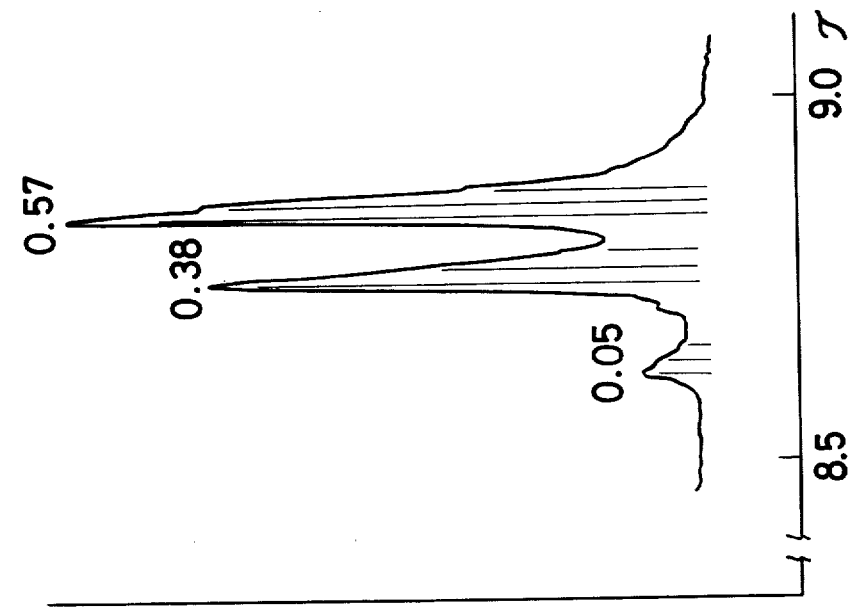

EXAMPLE 1:

In a four-necked flask having an inner volume of 300ml and provided with a gas inlet tube, a thermometer, a raw material inlet and a condenser fitted at the extremity thereof with a gas outlet tube, 2ml (16 millimols) of a methanol solution of sodium methylate was placed and heated at 80° to 100°C in the atmosphere of argon gas to have methanol thoroughly removed therefrom by distillation. To the flask, 80ml of diethyl ether which is a solvent of low dielectric constant was introduced to dissolve the remaining alcoholate. Then, 60ml of methyl methacrylate containing about 10 millimols of 2,4,6-tris(dimethylaminophenol) as the radical polymerization inhibitor was introduced and the resultant mixture was gradually heated, while under simultaneous agitation, over a period of about 30 to 60 minutes. The liquid mixture began to boil and becomes viscous as the temperature reached 55.5°C. The liquid was kept in the neighborhood of this temperature for about 30 minutes, and at the end of which period the reaction was terminated by addition of 1.2ml (20 millimols) of acetic acid. The ether solution containing the formed polymer and sodium acetate was diluted with about 200ml of benzene and then filtered through a silica gel column to have sodium acetate removed by adsorption. Then, the filtrate was distilled to be evacuated the solvent component. Consequently, polymethyl methacrylate having a stereospecific structure abounding in an isotactic component and having an average molecular weight of 19800 was obtained in a yield of 91%. The stereospecific structure of this polymer was determined by the spectrum obtained on a nuclear magnetic resonance apparatus. FIG. 2 (1) shows the nuclear magnetic resonance spectrum illustrating the stereospecificity of this polymer. The characteristic of the stereospecificity is indicated by the plots falling in the vertical line 2 of the graph of FIG. 1.

EXAMPLE 2:

In a four-necked flask having an inner volume of 300ml and having a similar provision to that used in Example 1, 2ml (16 millimols) of methanol solution of sodium methylate was placed and treated similarly in the atmosphere of argon gas. To the flask, 50ml of diethyl ether which is a solvent of low dielectric constant and 10ml of dioxane were added to dissolve the remaining sodium methylate. Then, 50ml of methyl methacrylate containing therein 10 millimols of 2,4,6-tris(dimethylaminophenol) as the radical polymerization inhibitor was added and the resultant mixture was gradually heated, while under simultaneous agitation, over a period of about 30 to about 60 minutes. The liquid mixture began to boil and becomes viscous as the temperature reached 60°C. The liquid was kept in the neighborhood of this temperature for about 1 hour, at the end of which period the reaction was terminated by adding 1.2ml of acetic acid. The ether-dioxane solution containing the formed polymer and sodium acetate was diluted with about 200ml of benzene and then treated with a column of silica gel to be freed from sodium acetate. Then, the filtrate was distilled to evacuate the solvent component. Consequently, polymethyl methacrylate having a stereospecific structure abounding in an isotactic component and having an average molecular weight of 17600 was obtained in a yield of 88%. The stereospecific structure of this polymer was determined by the same method as in Example 1. The characteristic of the stereospecificity is indicated by the plots falling in the vertical line 1 of the graph of FIG. 1.

EXAMPLE 3:

In a four-necked flask having an inner volume of 300ml and having a similar provision to that used in Example 1, 2ml (16 millimols) of methanol solution of sodium methylate was placed and treated similarly in the atmosphere of argon gas. To the flask, 50ml of dimethyl formamide which is a solvent of high dielectric constant was introduced to dissolve the remaining sodium methylate. Then, 50ml of methyl methacrylate containing therein about 10 millimols of 2,4,6-tris(-dimethylaminophenol) as the radical polymerization inhibitor was added and the resultant mixture was gradually heated, while under simultaneous agitation, over a period of about 20 minutes to 60°C. From this point on, the temperature of the liquid mixture sharply rose as the mixture evolved heat without application of external heat and the temperature fell immediately thereafter. After about 30 minutes of further agitation, the reaction was terminated by adding 1.2ml of acetic acid. The dimethyl formamide solution containing therein the formed polymer and sodium acetate was diluted with about 200ml of benzene and then filtered through a silica gel column to have sodium acetate removed therefrom. Then, the filtrate was distilled to be evacuated the solvent component. Consequently, polymethyl methacrylate having a stereospecific structure abounding in a syndiotactic component and having an average molecular weight of 14700 was obtained in a yield of 89%. The stereochemical composition of this polymer was determined by the same method as in Example 1. FIG. 2 (2) represents the nuclear magnetic resonance spectrum indicating the stereospecific structure of this polymer. The characteristic of this stereospecificity is indicated by the plots falling in the vertical line 7 of the graph of FIG. 1.

EXAMPLE 4

In a four-necked flask having an inner volume of 300ml and having a similar provision to that used in Example 1, 2ml (16 millimols) of methanol solution of sodium methylate was placed and treated similarly in the atmosphere of argon gas. To the flask, 40ml of tetrahydrofuran which is a solvent of low dielectric constant was added to dissolve the remaining sodium methylate and 40ml of n-hexane which is a non-polar solvent was additionally introduced to dilute the resultant solution. Then, 52ml of methyl methacrylate containing therein about 10 millimols of 2,4,6-tris(dimethylaminophenol) as the radical polymerization inhibitor was added and the resultant mixture was gradually heated, while under simultaneous agitation, over a period of about 40 minutes. The liquid mixture began to boil and becomes viscous as the liquid temperature reached about 70°C. The liquid was kept in the neighborhood of this temperature for about 45 minutes, at the end of which period the reaction was terminated by adding 1.2ml of acetic acid. The tetrahydrofuran-n-hexane solution containing therein the formed polymer and sodium acetate was diluted with about 200ml of benzene and then filtered through a silica gel column to have sodium acetate removed therefrom. Then, the filtrate was distilled to be evacuated the solvent component. Consequently, polymethyl methacrylate having a stereospecific structure abounding in an isotactic component and having an average molecular weight of 16400 was obtained in a yield of 93%. The stereochemical composition of this polymer was determined by the same method as in Example 1. The characteristic of the stereospecificity of the polymer is indicated by the plots falling in the vertical line 4 in the graph of FIG. 1.

EXAMPLE 5:

In a four-necked flask having an inner volume of 300ml and having a similar provision to that used in Example, 1, 2ml (16 millimols) of methanol solution of sodium methylate was placed and treated similarly in the atmosphere of argon gas. To the flask, 20ml of tetrahydrofuran which is a solvent of low dielectric constant was added to dissolve sodium methylate and 60ml of toluene which is a non-polar solvent was additionally introduced to dilute the resultant solution. Then, 52ml of methyl methacrylate containing therein about 10 millimols of 2,4,6-tris(dimethylaminophenol) as the radical polymerization inhibitor was added and the resultant mixture was gradually heated, while under simultaneous agitation, over a period of about 60 minutes. The liquid mixture becomes viscous as the temperature reached about 95°C. The liquid was kept in the neighborhood of this temperature for about one hour, at the end of which period the reaction was terminated by addition of 1,2ml of acetic acid. The tetrahydrofuran-toluene solution containing therein the formed polymer and sodium acetate was diluted with about 200ml of benzene, treated with a silica gel column to have sodium acetate removed therefrom. Then, the filtrate was distilled to evacuate the solvent component. Consequently, polymethyl methacrylate having a stereospecific structure abounding in an isotactic component and having an average molecular weight of 22000 was obtained in a yield of 79%. The stereochemical composition of this polymer was determined by the same method as in Example 1. FIG. 2 (3) shows the nuclear magnetic resonance spectrum illustrating the stereospecificity of this polymer. The characteristic of this stereospecificity is indicated by the vertical line 4 in the graph of FIG. 1 (similarly to Example 4).

EXAMPLE 6:

In a four-necked flask having an inner volume of 300ml and having a similar provision to that used in Example 1, 2ml (16 millimols) of methanol solution of sodium methylate was placed and treated similarly in and atmosphere of argon gas. To the flask, 50ml of dimethyl sulfoxide which is a solvent of high dielectric constant was added to dissolve sodium methylate. Then, 50ml of methyl methacrylate monomer containing therein about 10 millimols of 2,4,6-tris(dimethylaminophenol) as the radical polymerization inhibitor was added and the resultant mixture was agitated at room temperature (about 20°C). After about 10 minutes of the agitation, the liquid mixture rose to 70°C and became viscous because of self-evolution of heat. When the agitation was further continued, the liquid temperature gradually fell and reached 30°C in about 30 minutes. Subsequently, the liquid was heated to 60°C and kept at this temperature for 10 minutes, at the end of which period the reaction was terminated by addition of 1.2ml of acetic acid. The dimethyl sulfoxide solution containing therein the formed polymer and sodium acetate was diluted with about 200ml of benzene and treated with a silica gel column to have sodium acetate removed therefrom. Thereafter, the filtrate was distilled to evacuate the solvent component. Consequently, polymethyl methacrylate having a stereospecific structure abounding in a syndiotactic component and having an average molecular weight of 23600 was obtained in a yield of 92%. The stereochemical composition of this polymer was determined by the same method as in Example 1. FIG. 2 (4) shows the nuclear magnetic resonance spectrum illustrating the stereospecific structure of the polymer. The characteristic of the stereospecificity of the polymer is indicated by the vertical line 8 in the graph of FIG. 1.

EXAMPLE 7:

In a four-necked flask having an inner volume of 300ml and having a similar provision to that used in Example 1, 20ml (0.16 mol) of methanol solution of sodium methylate and 100ml of diethyl ether which is a solvent of low dielectric constant were placed, with the flask interior kept in and atmosphere of argon gas. Then, 105ml (0.97 mol) of methyl methacrylate containing therein about 20 millimols of hydroquinone as the radical polymerization inhibitor was added. The resultant mixture was gradually heated, while under agitation, over a period of about 30 to 60 minutes. The liquid mixture began to boil and became viscous as the temperature reached 66°C. The liquid was kept in the neighborhood of this temperature for about 1 hour, at the end of which period the reaction was terminated by addition of 12ml (0.2 mol) of acetic acid. The slightly viscous solution containing the reaction product was diluted with about 200ml of benzene and the resulting solution was filtered through a silica gel column to remove sodium acetate therefrom. Then, the filtrate was distilled to evacuate the solvent component. Consequently, there was obtained a viscous liquid. When this viscous liquid was distilled under reduced pressure, there were obtained methyl 3-methoxy 2-methyl propionate (145°C/760 mmHg in boiling point), a dimeric meso fraction (120°C/10 mmHg), a dimeric racemic fraction (170°C/10 mmHg), a trimeric syndiotactic fraction (190°C/3 mmHg), a trimeric heterotactic fraction (207°C/2 mmHg) and a trimeric isotactic fraction (240°C/2 mmHg) at a weight ratio of 3:3:2:1.

When the polymerization described above was repeated by using the same mol weight of potassium methylate in place of sodium methylate, there were obtained substantially the same results.

EXAMPLE 8:

In a four-necked flask having an inner volume of 300ml and having a similar provision to that used in Example 1, 15ml (0.12 mol) of methanol solution of sodium methylate and 100ml of dimethyl formamide which is a solvent of high dielectric constant were placed in the atmosphere of argon gas. To the resultant system, 105ml (0.97 mol) of methyl methacrylate containing therein 20 millimols of hydroquinone as the radical polymerization inhibitor was added and kept under agitation in the neighborhood of 5°C for about 2 hours. Thereafter, the reaction was terminated by addition of 9ml (0.15 mol) of acetic acid. The slightly viscous solution containing the reaction product was diluted with about 200ml of benzene. The solution was filtered through a silica gel column to have sodium acetate removed therefrom and then distilled to evacuate the solvent component. Consequently, there was obtained a viscous liquid. When this liquid was distilled under reduced pressure, there were obtained a dimeric meso fraction, a dimeric racemic fraction, a trimeric syndiotactic fraction and a trimeric heterotactic fraction separately of one another at a weight ratio of 2:3:3:1.

When the procedure was repeated under the same conditions except for substitution of the sodium methylate with the same mol weight of cesium methylate, there were obtained similar results.

EXAMPLE 9:

In a four-necked flask having an inner volume of 300ml and having a similar provision to that used in Example 1, 20ml (0.16 mol) of methanol solution of sodium methylate and 100ml of diethyl ether which is a solvent of low dielectric constant were placed in the atmosphere of argon gas. To the system, 15ml (1.4 mols) of refined β-methyl crotonate was added and, while under agitation, heated gradually over a period of about 30 minutes. The liquid mixture began to boil and become viscous as the liquid temperature reached 52°C. The liquid was kept in the neighborhood of this temperature for about 2 hours, at the end of which period the reaction was terminated by addition of 12ml (0.2 mol) of acetic acid. The viscous solution containing the reaction product was diluted with about 200ml of benzene and then filtered through a silica gel column to have sodium acetate removed therefrom. Then, the filtrate was distilled to evacuate the solvent component. Consequently, there was obtained a slightly yellowish viscous liquid. When this liquid was distilled under reduced pressure, there were obtained a monomeric fraction, a dimeric meso fraction, a dimeric racemic fraction and a trimeric fraction separately of one another at a weight ratio of 2:2:2:3.

EXAMPLE 10

In a four-necked flask having an inner volume of 500ml and having a similar provision to that used in Example 1, 20ml (0.16 mol) of methanol solution of sodium methylate and 200ml of dimethoxy ethane were placed in the atmosphere of argon gas. To the system, 320ml (3 mols) of methyl methacrylate containing about 20 millimols of hydroquinone as the radical polymerization inhibitor was added and, while under agitation, heated gradually over a period of about 30 minutes. The mixed liquid began to boil and become viscous when the liquid temperature reached 88°C. The liquid was kept in the neighborhood of this temperature for about two hours, at the end of which period the reaction was terminated by addition of 12ml (0.2 mol) of acetic acid. The viscous solution containing the reaction product was diluted with a roughly equal volume of benzene and then filtered through a silica gel column to have sodium acetate removed therefrom. Then, the filtrate was distilled to evacuate the solvent component to afford a viscous liquid. When this liquid was distilled, there were obtained a dimeric meso fraction, a dimeric racemic fraction, a trimeric syndiotactic fraction, a trimeric heterotactic fraction and a trimeric isotactic fraction separately of one another at a weight ratio of 1:1:2:3:2.

What is claimed is:

1. A method for the manufacture of a polymer, which comprises dissolving an alcoholate selected from the group consisting of sodium methylate, sodium ethylate, sodium butylate, potassium methylate, potassium ethylate and potassium butylate free of interfering amounts of an alcohol in a non-protonic, polar organic solvent, admixing a radical polymerization inhibitor and a vinyl monomer selected from the group consisting of acrylic esters, methacrylic esters, vinyl ketones, α-methylvinyl ketones, β-methyl crotonic esters, acrylonitrile and methacrylonitrile into said alcoholate containing solvent in amounts such that the molar ratio of said alcoholate to said vinyl monomer is not more than 1:35, and subjecting said vinyl monomer to anionic polymerization, whereby a high molecular weight polymer is obtained having a stereospecific structure which conforms to Bernoullian statistics.

2. The method of claim 1, wherein said non-protonic organic solvent is at least one solvent selected from the group consisting of dioxane, diethylether, dimethoxyethane, tetrahydrofuran, tetrahydropyran, dimethylformamide, dimethylacetamide, dimethylsulfoxide, tetramethylurea and hexamethylphosphoramide or is a solution of said solvent diluted with an inert solvent selected from the group consisting of n-hexane, cyclohexane, toluene and benzene.

3. A method for the manufacture of a low molecular weight polymer, which comprises:
dissolving an alcoholate selected from the group consisting of sodium methylate, sodium ethylate, sodium butylate, potassium methylate, potassium ethylate and potassium butylate containing an alcohol in a non-protonic polar organic solvent.

admixing a radical polymerization inhibitor and a vinyl monomer selected from the group consisting of acrylic esters, methacrylic esters, vinyl ketones, α-methyl vinyl ketones, β-methyl crotonic esters, acrylonitrile and methacrylonitrile into said alcoholate containing solution in amounts such that the ratio of the sum of the number of moles of the alcoholate and the alcohol to the number of moles of the charged vinyl monomer is 1:2; and
subjecting said vinyl monomer containing mixture to anionic polymerization, whereby a low molecular weight dimer is obtained consisting of a mixture of meso and racemic isomers in a regulated ratio.

4. The method of claim 3, wherein said non-protonic organic solvent is at least one solvent selected from the group consisting of dioxane, diethylether, dimethoxyethane, tetrahydrofuran, tetrahydropyran, dimethylformamide, dimethylacetamide, dimethylsulfoxide, tetramethylurea and hexamethylphosphoramide or is a solution of said solvent diluted with an inert solvent selected from the group consisting of n-hexane, cyclohexane, toluene and benzene.

5. A method for the manufacture of a low molecular weight polymer, which comprises:
dissolving an alcoholate selected from the group consisting of sodium methylate, sodium ethylate, sodium butylate, potassium methylate, potassium ethylate and potassium butylate containing an alcohol in a non-protonic polar organic solvent;
admixing a radical polymerization inhibitor and a vinyl monomer selected from the group consisting of acrylic esters, methacrylic esters, vinyl ketones, α-methyl vinyl ketones, β-methyl crotonic esters, acrylonitrile and methacrylonitrile into said alcoholate containing solution in amounts such that the ratio of the sum of the number of moles of alcoholate and the alcohol to the number of moles of the charged vinyl monomer is sufficient to achieve a trimer product; and
subjecting said vinyl monomer containing mixture to anionic polymerization, whereby a low molecular weight trimer is obtained consisting of a mixture of isotactic, heterotactic and syndiotactic isomers in a regulated ratio.

6. The method of claim 5, wherein said non-protonic organic solvent is at least one solvent selected from the group consisting of dioxane, diethylether, dimethoxyethane, tetrahydrofuran, tetrahydropyran, dimethylformamide, dimethylacetamide, dimethylsulfoxide, tetramethylurea and hexamethylphosphoramide or is a solution of said solvent diluted with an inert solvent selected from the group consisting of n-hexane, cyclohexane, toluene and benzene.

* * * * *